United States Patent
Earnshaw et al.

(10) Patent No.: US 11,006,462 B2
(45) Date of Patent: *May 11, 2021

(54) SYSTEM AND METHOD FOR HANDLING OF AN UPLINK TRANSMISSION COLLISION WITH AN ACK/NACK SIGNAL

(75) Inventors: Andrew Mark Earnshaw, Kanata (CA); Zhijun Cai, Ashburn, VA (US)

(73) Assignee: BlackBerry Limited, Waterloo (CA)

( * ) Notice: Subject to any disclaimer, the term of this patent is extended or adjusted under 35 U.S.C. 154(b) by 0 days.

This patent is subject to a terminal disclaimer.

(21) Appl. No.: 14/402,776

(22) PCT Filed: Sep. 10, 2012

(86) PCT No.: PCT/US2012/054441
§ 371 (c)(1),
(2), (4) Date: Mar. 13, 2015

(87) PCT Pub. No.: WO2013/176695
PCT Pub. Date: Nov. 28, 2013

(65) Prior Publication Data
US 2015/0189546 A1  Jul. 2, 2015

Related U.S. Application Data

(60) Provisional application No. 61/649,764, filed on May 21, 2012.

(51) Int. Cl.
*H04W 74/08* (2009.01)
*H04L 1/18* (2006.01)
(Continued)

(52) U.S. Cl.
CPC ....... *H04W 74/0858* (2013.01); *H04L 1/1671* (2013.01); *H04L 1/1812* (2013.01);
(Continued)

(58) Field of Classification Search
None
See application file for complete search history.

(56) References Cited

U.S. PATENT DOCUMENTS

| 8,416,746 B2 * | 4/2013 | Fong | H04L 63/162 |
| | | | 370/332 |
| 2006/0153117 A1 * | 7/2006 | Bichot | H04W 74/02 |
| | | | 370/316 |

(Continued)

FOREIGN PATENT DOCUMENTS

| EP | 2823653 | 1/2015 |
| WO | WO 2008/041820 | 4/2008 |
| WO | WO 2010/053982 | 5/2010 |

OTHER PUBLICATIONS

3GPP TSG-RAN WG2 Meeting #77bix "Handling of a SR Collision with Ack/NACK Repetition".*

(Continued)

*Primary Examiner* — Jamaal Henson
(74) *Attorney, Agent, or Firm* — Fish & Richardson P.C.

(57) ABSTRACT

Systems and methods for handling of an uplink transmission collision with an ACK/NACK signal are provided. An ACK/NACK may be configured for a repetition sequence. The ACK/NACK signal transmission on a particular subframe can be refrained due to the collision. The UL transmission can be performed on the subframe.

8 Claims, 9 Drawing Sheets

(51) Int. Cl.
*H04L 1/16* (2006.01)
*H04W 72/04* (2009.01)

(52) U.S. Cl.
CPC ......... *H04L 1/1858* (2013.01); *H04W 72/042* (2013.01); *H04W 72/0413* (2013.01); *H04W 74/085* (2013.01)

(56) References Cited

U.S. PATENT DOCUMENTS

| | | | |
|---|---|---|---|
| 2008/0055067 A1* | 3/2008 | Curt | H04B 3/542 340/538.12 |
| 2009/0274107 A1* | 11/2009 | Park | H04L 12/66 370/329 |
| 2010/0034158 A1* | 2/2010 | Meylan | H04L 1/1854 370/329 |
| 2010/0173641 A1* | 7/2010 | Kim | H04L 5/0026 455/450 |
| 2010/0195629 A1* | 8/2010 | Chen | H04L 1/1861 370/336 |
| 2010/0316096 A1* | 12/2010 | Adjakple | H04L 1/1887 375/211 |
| 2010/0331037 A1 | 12/2010 | Jen | |
| 2011/0205961 A1* | 8/2011 | Santivanez | H04W 74/0816 370/328 |
| 2011/0310821 A1* | 12/2011 | Kim | H04B 7/15542 370/329 |
| 2012/0039279 A1* | 2/2012 | Chen | H04L 1/1861 370/329 |
| 2013/0083708 A1* | 4/2013 | Lin | H04L 5/14 370/280 |
| 2013/0083737 A1* | 4/2013 | Earnshaw | H04L 1/1887 370/329 |
| 2013/0155942 A1* | 6/2013 | Lee | H04L 1/1858 370/315 |
| 2013/0235808 A1* | 9/2013 | Earnshaw | H04W 72/12 370/329 |

OTHER PUBLICATIONS

3GPP TSG-RAN WG2 Meeting #77bis "Handling of a SR Collision with ACK/NACK Repetition".*
3GPP TSG RAN WG1 meeting #63, "Simultaneous Transmission of CQI and ACK/NACK in Carrier Aggregation", discloses dropping the CQI and transmitting the ACK, see section 2 "Discussion" (Year: 2012).*
3GPP TSG-RAN WG2 Meeting #77bis "Handling of a SR Collision with ACK/NACK Repetition" (Year: 2012).*
3GPP TSG RAN WG1 Meeting #63 "Simultaneous Transmission of CQI and ACK/NACK in Carrier Aggregation" discusses dropping the CQI and transmitting the ACK, see section 2 "Discussion" (Year: 2012).*
TSG-RAN WG1 #55 Prague, Czech Republic, Nov. 10-14, 2008 "Solve DTX for Bundled ACK/NACK Collide with CQI/PMI or SR on PUCCH" (Year: 2008).*
3GPP TSG-RAN WG2 Meeting #77bis "Handling of an SR Collision with ACK/NACK Repetition" (Year: 2012).*
International Search Report and Written Opinion of the International Searching Authority issued in International Application No. PCT.US2012/054441 dated Nov. 23, 2012; 12 pages.
Written Opinion of the International Preliminary Examining Authority issued in International Application No. PCT/US2012/054441 dated Apr. 24, 2014; 9 pages.
International Preliminary Report on Patentability issued in International Application No. PCT/US2012/054441 dated Jul. 29, 2014; 20 pages.
Office Action issued in Canadian Application No. 2874330 dated Mar. 14, 2017.
Office Action issued in Canadian Application No. 2874330 dated Apr. 3, 2018, 4 pages.
European Patent Office Communication pursuant to Article 94(3) EPC in European Application No. 12762156.3 dated Mar. 5, 2018, 6 pages.
European Patent Office Communication pursuant to Article 94(3) EPC in European Application No. 13758115.3 dated Nov. 23, 2017, 5 pages.
Office action issued in Canadian Application No. 2874330 dated Jan. 22, 2020, 3 pages.
Examiner's Report issued in Canadian Application No. 2874330 dated Feb. 1, 2019, 4 pages.
Communication Pursuant to Article 94 (3) EPC issued in European Application No. 12762156.3 dated Oct. 16, 2020, 5 pages.
Examiner's Report issued in Canadian Application No. 2874330 dated Nov. 3, 2020, 3 pages.
Communication Pursuant to Article 94 (3) EPC issued in European Application No. 12762156.3 dated Oct. 17, 2019, 5 pages.

* cited by examiner

SYSTEM AND METHOD FOR HANDLING OF AN UPLINK TRANSMISSION COLLISION WITH AN ACK/NACK SIGNAL

CLAIM OF PRIORITY

This application is a U.S. National Stage of PCT/US2012/054441 filed on Sep. 10, 2012, which claims priority to U.S. Provisional Application Ser. No. 61/649,764 filed on May 21, 2012, the entire contents of which are hereby incorporated by reference.

FIELD

This disclosure relates to data transmission in wireless communication systems, and more particularly, to systems and methods for handling of an uplink transmission collision with an acknowledgement (ACK)/negative acknowledgement (NACK) signal.

BACKGROUND

In an evolved universal terrestrial radio access network (E-UTRAN), new data transmissions or retransmissions may result in the transmission of an uplink shared channel (UL-SCH) medium access control (MAC) protocol data unit (PDU) in the form of a physical uplink shared channel (PUSCH) transport block. The UL-SCH is an uplink transport channel mapped directly to the PUSCH physical channel. A physical layer ACK/NACK transmission is used in the E-UTRAN network to provide feedback information to the transmitter regarding whether a transmitted downlink transport block on the Physical Downlink Shared Channel (PDSCH) is successfully received or not. Further, an ACK/NACK may be repeatedly transmitted on the uplink in consecutive uplink subframes to allow better reception quality at the receiver side when the channel conditions are poor.

BRIEF DESCRIPTION OF DRAWINGS

Like reference symbols in the various drawings indicate like elements.

DETAILED DESCRIPTION

Figure 1:
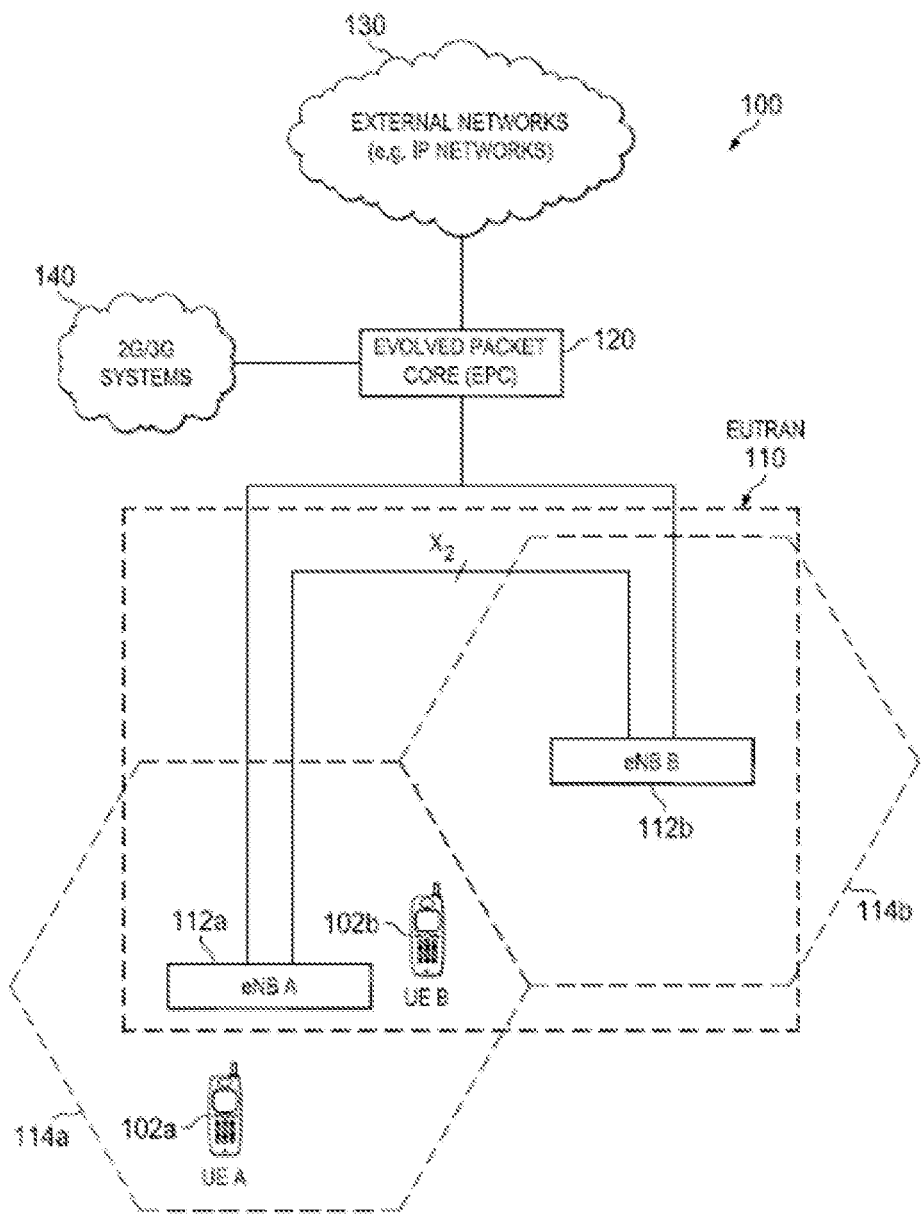
FIG. 1 is a schematic representation of an example wireless cellular communication system based on 3GPP long term evolution (LTE).

The following detailed description presents various embodiments of the present disclosure. However, the present disclosure is intended to provide a multitude of different ways as defined and covered by the claims. In this description, reference is made to the drawings where like reference numerals indicate like or functionally similar elements.

The terminology used in the description presented herein is not intended to be interpreted in any limited or restrictive manner, simply because it is being utilized in conjunction with a detailed description of certain specific embodiments of the disclosure. Furthermore, embodiments of the disclosure may include several novel features, no single one of which is solely responsible for its desirable attributes or which is essential to practicing the disclosure herein described.

Embodiments are described herein in the context of an LTE wireless network or system, but can be adapted for other wireless networks or systems. The LTE wireless network described herein is generally in compliance with the 3GPP LTE standard, including, but not limited to, Releases 8, Release 9, Release 10, Release 11, and beyond.

As used herein, the terms "user equipment" and "UE" can refer to wireless devices and similar devices or other User Agents ("UA") that have telecommunications capabilities. In some embodiments, a UE may refer to a mobile, wireless device. The term "UE" may also refer to devices that have similar capabilities, but that are not generally transportable, such as desktop computers or set-top boxes.

Examples of user equipment include, but are not limited to, a mobile phone, a smart phone, a telephone, a television, a remote controller, a set-top box, a computer monitor, a computer (including a tablet computer such as a BlackBerry® Playbook tablet, a desktop computer, a handheld or laptop computer, a netbook computer), a personal digital assistant (PDA), a microwave, a refrigerator, a stereo system, a cassette recorder or player, a DVD player or recorder, a CD player or recorder, a VCR, an MP3 player, a radio, a camcorder, a camera, a digital camera, a portable memory chip, a washer, a dryer, a washer/dryer, a copier, a facsimile machine, a scanner, a multi-functional peripheral device, a wristwatch, a clock, and a game device, Such a UE might include a device and its associated removable memory module, such as a Universal Integrated Circuit Card (UICC) that includes a Subscriber Identity Module (SIM) application, a Universal Subscriber Identity Module (USIM) application, or a Removable User Identity Module (R-UIM) application. Alternatively, such a UE might include the device itself without such a module. The term "UE" can also refer to any hardware or software component that can terminate a communication session for a user. In addition, the terms "user equipment," "UE," "user equipment device," "user agent," "UA," "user device," and "mobile device" can be used synonymously herein.

In traditional wireless telecommunications systems, transmission equipment in a base station or other network node transmits signals throughout a geographical region known as a cell. As technology has evolved, more advanced equipment has been introduced that can provide services that were not possible previously. This advanced equipment might include, for example, an E-UTRAN evolved Node B (eNB) rather than a base station or other systems and devices that are more highly evolved than the equivalent equipment in a traditional wireless telecommunications system. In the context of this document, the term "eNB" can be interchangeably used with an "evolved node B" or an "enhanced node B." Such advanced or next generation equipment may be referred to herein as long-term evolution (LTE) equipment, and a packet-based network that uses such equipment can be referred to as an evolved packet system (EPS). Additional improvements to LTE systems and equipment result in an LTE Advanced (LTE-A) system. As used herein, the phrase "base station" may refer to any component or network node, such as a traditional base station or an LTE or LTE-A base station (including eNBs), that can provide a UE with access to other components in a telecommunications system.

The present disclosure pertains to systems and methods for handling of an uplink transmission collision with an ACK/NACK signal. The collision may occur when a UE is configured to transmit a physical shared channel (PUSCH) transmission and an ACK/NACK signal at the same subframe. Certain aspects of the disclosure are directed to systems and methods for determining that a pending uplink transmission collides with a transmission of an ACK/NACK signal. The ACK/NACK signal may be part of an ACK/NACK repetition sequence. Responsive to the determining that a collision has or would occur, the UE can refrain from transmitting the ACK/NACK signal on the collision subframe, and the UL transmission can proceed.

FIG. 1 is a schematic representation of an example wireless cellular communication system 100 based on the third generation partnership project (3GPP) LTE, also known as Evolved Universal Terrestrial Radio Access (E-UTRA). The cellular network system 100 shown in FIG. 1 includes a plurality of base stations 112a and 112b. In the LTE example of FIG. 1, the base stations are shown as evolved Node Bs (eNBs) 112a and 112b. It will be understood that the base station may operate in any mobile environment, including macro cell, femto cell, pico cell, or the base station may operate as a node that can relay signals for other mobile and/or base stations. The example LTE telecommunications environment 100 of FIG. 1 may include one or a plurality of radio access networks 110, core networks (CNs) 120, and external networks 130. In certain implementations, the radio access networks may be E-UTRANs. In addition, in certain instances, core networks 120 may be evolved packet cores (EPCs). Further, there may be one or more mobile electronic devices 102a, 102b operating within the LTE system 100. In some implementations, 2G/3G systems 140, e.g., Global System for Mobile communication (GSM), Interim Standard 95 (IS-95), Universal Mobile Telecommunications System (UMTS) and CDMA2000 (Code Division Multiple Access) may also be integrated into the LTE telecommunication system 100.

In the example LTE system shown in FIG. 1, the EUTRAN 110 includes eNB 112a and eNB 112b. Cell 114a is the service area of eNB 112a and Cell 114b is the service area of eNB 112b. UEs 102a and 102b operate in Cell 114a and are served by eNB 112a. The EUTRAN 110 can include one or a plurality of eNBs 112a, 112b and one or a plurality of UEs 102a, 102b can operate in a cell. The eNBs 112a and 112b communicate directly to the UEs 102a and 102b. In some implementations, the eNB 112a or 112b may be in a one-to-many relationship with the UEs 102a and 102b, e.g., eNB 112a in the example LTE system 100 can serve multiple UEs 102 (i.e., UE 102a and UE 102b) within its coverage area Cell 114a, but each of UE 102a and UE 102b may be connected only to one eNB 112a at a time. In some implementations, the eNBs 112a and 112b may be in a many-to-many relationship with the UEs, e.g., UE 102a and UE 102b can be connected to eNB 112a and eNB 112b. The eNB 112a may be connected to eNB 112b with which handover may be conducted if one or both of the UEs 102a and UE 102b travels from cell 114a to cell 114b. The UEs 102a and 102b may be any wireless electronic device used by an end-user to communicate, for example, within the LTE system 100. The UE 102a or 102b may be referred to as mobile electronic device, user device, mobile station, subscriber station, or wireless terminal. The UE 102a or 102b may be a cellular phone, personal data assistant (PDA), smart phone, laptop, tablet personal computer (PC), pager, portable computer, or other wireless communications device.

The UEs 102a and 102b may transmit voice, video, multimedia, text, web content and/or any other user/client-specific content. On the one hand, the transmission of some of these contents, e.g., video and web content, may require high channel throughput to satisfy the end-user demand. On the other hand, the channel between UEs 102a, 102b and eNBs 112a, 112b may be contaminated by multipath fading, due to the multiple signal paths arising from many reflections in the wireless environment. Accordingly, the UEs' transmission may adapt to the wireless environment. In short, the UEs 102a and 102b generate requests, send responses or otherwise communicate in different means with Evolved Packet Core (EPC) 120 and/or Internet Protocol (IP) networks 130 through one or more eNBs 112a and 112b.

A radio access network is part of a mobile telecommunication system which implements a radio access technology, such as UMTS, CDMA2000 and 3GPP LTE. In many applications, the Radio Access Network (RAN) included in an LTE telecommunications system 100 is called an EUTRAN 110. The EUTRAN 110 can be located between the UEs 102a, 102b and EPC 120. The EUTRAN 110 includes at least one eNB 112a or 112b. The eNB can be a radio base station that may control all or at least some radio related functions in a fixed part of the system. The at least one eNB 112a or 112b can provide radio interface within their coverage area or a cell for the UEs 102a, 102b to communicate. The eNBs 112a and 112b may be distributed throughout the cellular network to provide a wide area of coverage. The eNBs 112a and 112b directly communicate with one or a plurality of UEs 102a, 102b, other eNBs, and the EPC 120.

The eNBs 112a and 112b may be the end point of the radio protocols towards the UEs 102a, 102b and may relay signals between the radio connection and the connectivity towards the EPC 120. In certain implementations, the EPC 120 is the main component of a core network (CN). The CN can be a backbone network, which may be a central part of the telecommunications system. The EPC 120 can include a mobility management entity (MME), a serving gateway (SGW), and a packet data network gateway (PGW). The MME may be the main control element in the EPC 120 responsible for the functionalities comprising the control plane functions related to subscriber and session management. The SGW can serve as a local mobility anchor, such that the packets are routed through this point for intra EUTRAN 110 mobility and mobility with other legacy 2G/3G systems 140. The SGW functions may include the user plane tunnel management and switching. The PGW may provide connectivity to the services domain comprising external networks 130, such as the IP networks. The UEs 102a, 102b, EUTRAN 110, and EPC 120 are sometimes referred to as the evolved packet system (EPS). It is to be understood that the architectural evolvement of the LTE system 100 is focused on the EPS. The functional evolution may include both EPS and external networks 130.

Though described in terms of FIG. 1, the present disclosure is not limited to such an environment. In general, cellular telecommunication systems may be described as cellular networks made up of a number of radio cells, or cells that are each served by a base station or other fixed transceiver. The cells are used to cover different areas in order to provide radio coverage over an area. Example cellular telecommunication systems include Global System for Mobile Communication (GSM) protocols, Universal Mobile Telecommunications System (UMTS), 3GPP Long Term Evolution (LTE), and others. In addition to cellular telecommunication systems, wireless broadband communication systems may also be suitable for the various implementations described in the present disclosure. Example wireless broadband communication systems include IEEE 802.11 wireless local area network, IEEE 802.16 WiMAX network, etc.

Figure 2:
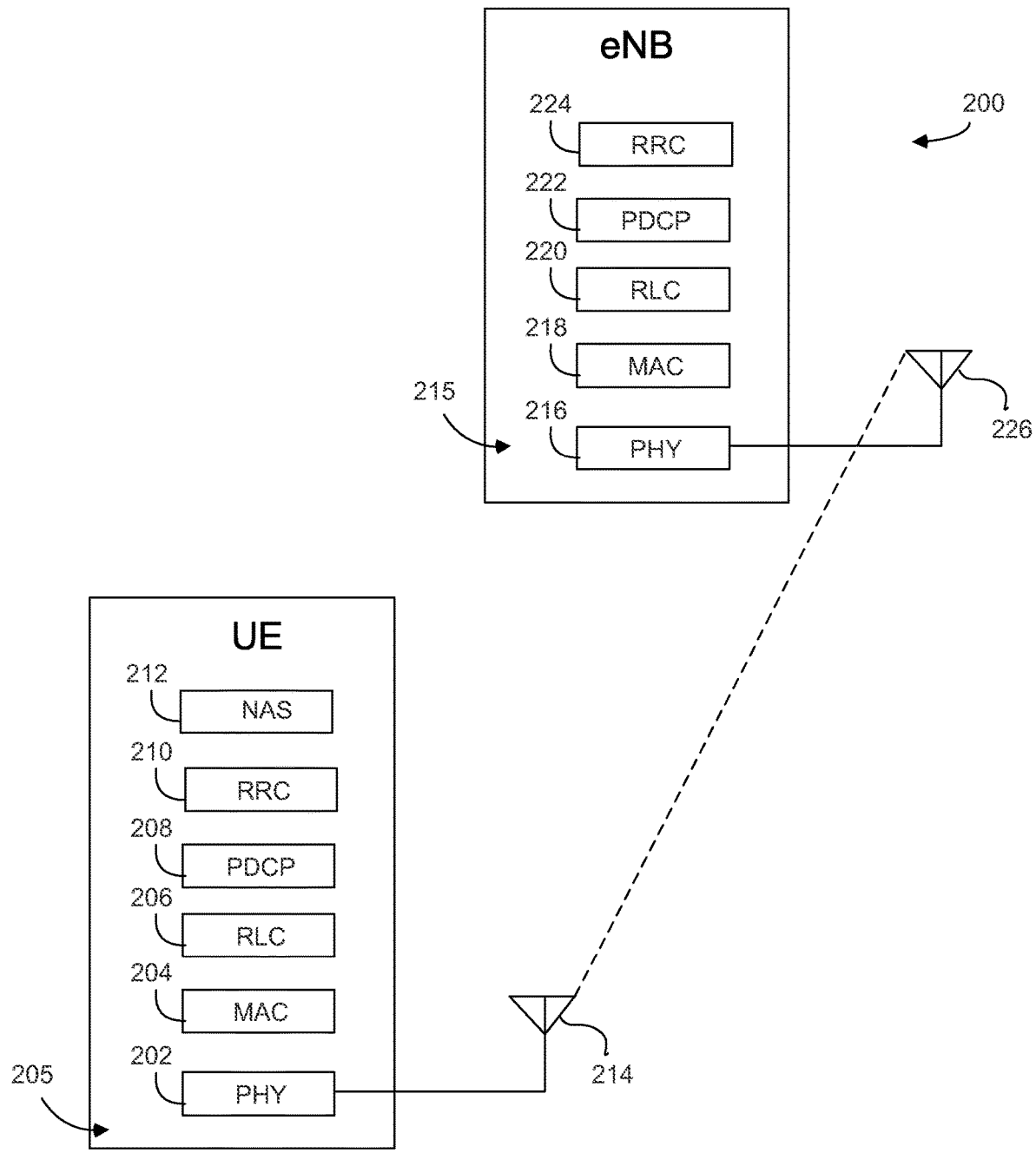
FIG. 2 is a schematic block diagram illustrating various layers of an access node and user equipment in a wireless communication network according to one embodiment.

FIG. 2 is a schematic block diagram 200 illustrating various layers of an access node and user equipment in a wireless communication network according to one embodiment. The illustrated system 200 includes a UE 205 and an eNB 215. The eNB 215 can be referred to as a "network," "network component," "network element," "access node," or "access device." FIG. 2 shows only these two devices (alternatively, referred to as "apparatuses" or "entities") for illustrative purposes, and a skilled artisan will appreciate that the system 200 can further include one or more of such devices, depending on the needs. The eNB 215 can communicate wirelessly with the UE 205.

Each of the devices 205 and 215 includes a protocol stack for communications with other devices via wireless and/or wired connection. The UE 205 can include a physical (PHY) layer 202, a medium access control (MAC) layer 204, a radio link control (RLC) layer 206, a packet data convergence protocol (PDCP) layer 208, a radio resource control (RRC) layer 210, and a non-access stratum (NAS) layer 212. The UE 205 may also include one or more antennas 214 coupled to the PHY layer 202. In the illustrated embodiment, a "PHY layer" can also be referred to as "layer 1." The other layers (MAC layer, RLC layer, PDCP layer, RRC layer and above) can be collectively referred to as a "higher layer(s)."

The eNB 215 can also include a physical (PHY) layer 216, a medium access control (MAC) layer 218, a radio link control (RLC) layer 220, a packet data convergence protocol (PDCP) layer 222, and a radio resource control (RRC) layer 224. In case of user plane communication for data traffic, the RRC layer is not involved. The eNB 215 may also include one or more antennas 226 coupled to the PHY layer 216.

Communications between the devices, such as between the eNB 215 and the UE 205, generally occur within the same protocol layer between the two devices. Thus, for example, communications from the RRC layer 224 at the eNB 215 travel through the PDCP layer 222, the RLC layer 220, the MAC layer 218, and the PHY layer 216, and are sent over the PHY layer 216 and the antenna 226 to the UE 205. When received at the antenna 214 of the UE 205, the communications travel through the PHY layer 202, the MAC layer 204, the RLC layer 206, the PDCP layer 208 to the RRC layer 210 of the UE 205. Such communications are generally done utilizing a communications sub-system and a processor, as described in more detail below.

Figure 3:
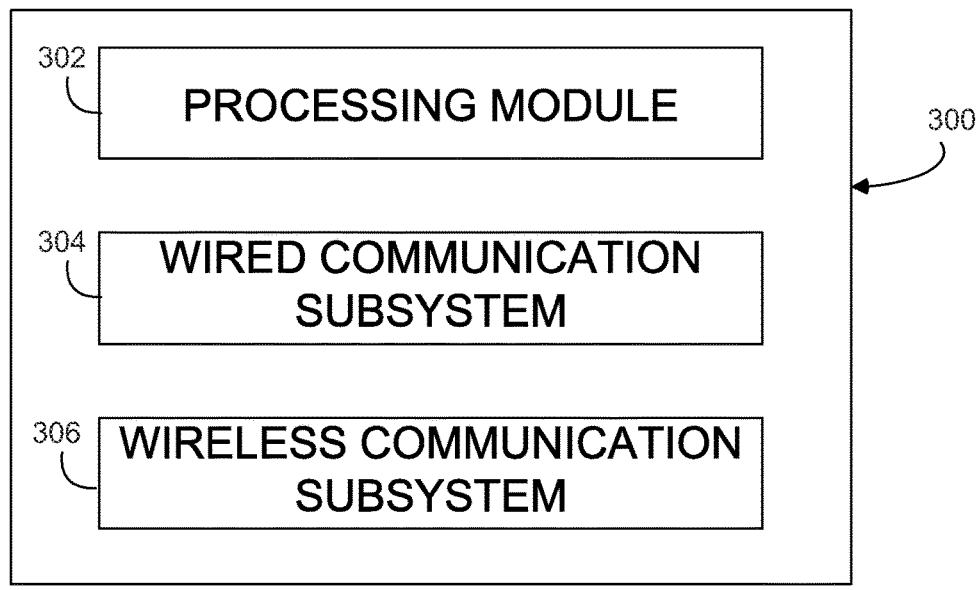
FIG. 3 is a schematic block diagram illustrating an access node device according to one embodiment.

FIG. 3 is a schematic block diagram 300 illustrating an access node device according to one embodiment. The illustrated device 300 includes a processing module 302, a wired communication subsystem 304, and a wireless communication subsystem 306. The processing module 302 can include one or more processing components (alternatively referred to as "processors" or "central processing units" (CPUs)) capable of executing instructions related to one or more of the processes, steps, or actions described above in connection with one or more of the embodiments disclosed herein. The processing module 302 can also include other auxiliary components, such as random access memory (RAM), read only memory (ROM), secondary storage (for example, a hard disk drive or flash memory). The processing module 302 can form at least part of the layers described above in connection with FIG. 2. The processing module 302 can execute certain instructions and commands to provide wireless or wired communication, using the wired communication subsystem 304 or a wireless communication subsystem 306. A skilled artisan will readily appreciate that various other components can also be included in the device 300.

Figure 4:
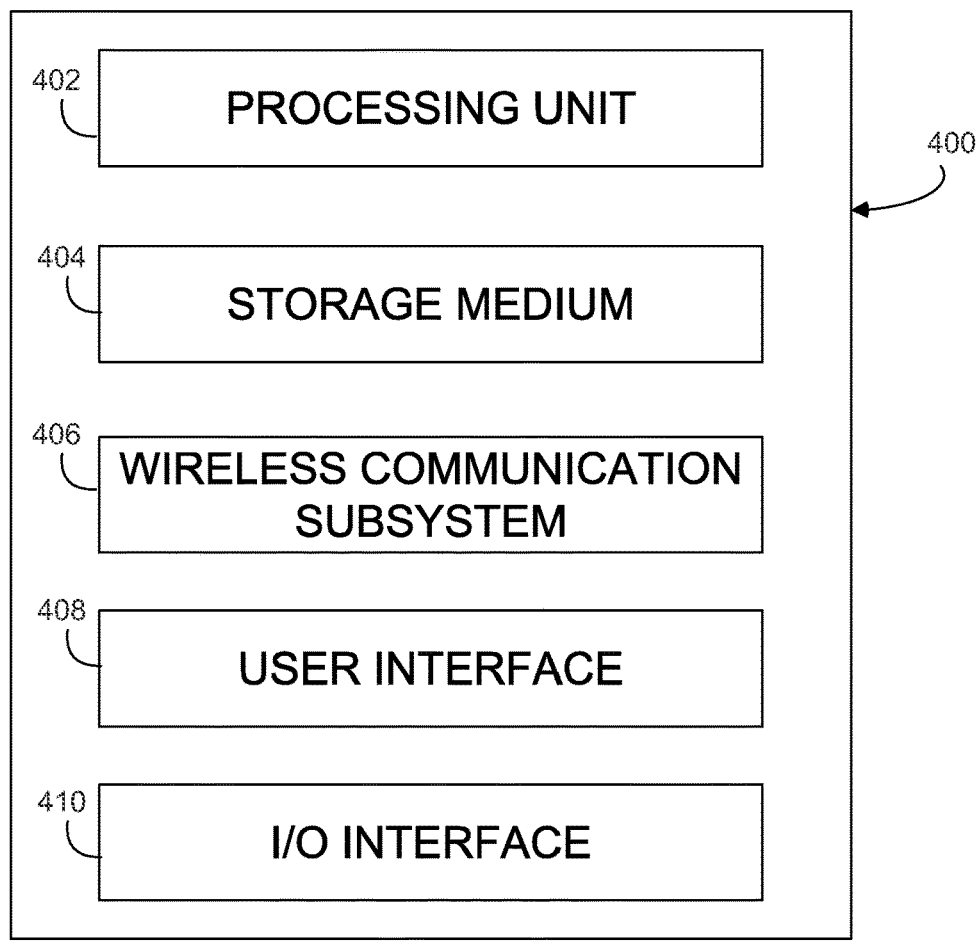
FIG. 4 is a schematic block diagram illustrating a user equipment device according to one embodiment.

FIG. 4 is a schematic block diagram 400 illustrating a user equipment device according to one embodiment. The illustrated device 400 includes a processing unit 402, a computer readable storage medium 404 (for example, ROM or flash memory), a wireless communication subsystem 406, a user interface 408, and an I/O interface 410.

Similar to the processing module 302 of FIG. 3, the processing unit 402 can include one or more processing components (alternatively referred to as "processors" or "central processing units" (CPUs)) configured to execute instructions related to one or more of the processes, steps, or actions described above in connection with one or more of the embodiments disclosed herein. The processing unit 402 can also include other auxiliary components, such as random access memory (RAM) and read only memory (ROM). The computer readable storage medium 404 can store an operating system (OS) of the device 400 and various other computer executable software programs for performing one or more of the processes, steps, or actions described above.

The wireless communication subsystem 406 is configured to provide wireless communication for data and/or control information provided by the processing unit 402. The wireless communication subsystem 406 can include, for example, one or more antennas, a receiver, a transmitter, a local oscillator, a mixer, and a digital signal processing (DSP) unit. In some embodiments, the subsystem 406 can support multiple input multiple output (MIMO) transmissions.

The user interface 408 can include, for example, one or more of a screen or touch screen (for example, a liquid crystal display (LCD), a light emitting display (LED), an organic light emitting display (OLED), a microelectromechanical system (MEMS) display), a keyboard or keypad, a trackball, a speaker, and a microphone. The I/O interface 410 can include, for example, a universal serial bus (USB) interface. A skilled artisan will readily appreciate that various other components can also be included in the device 400.

Figure 5A:
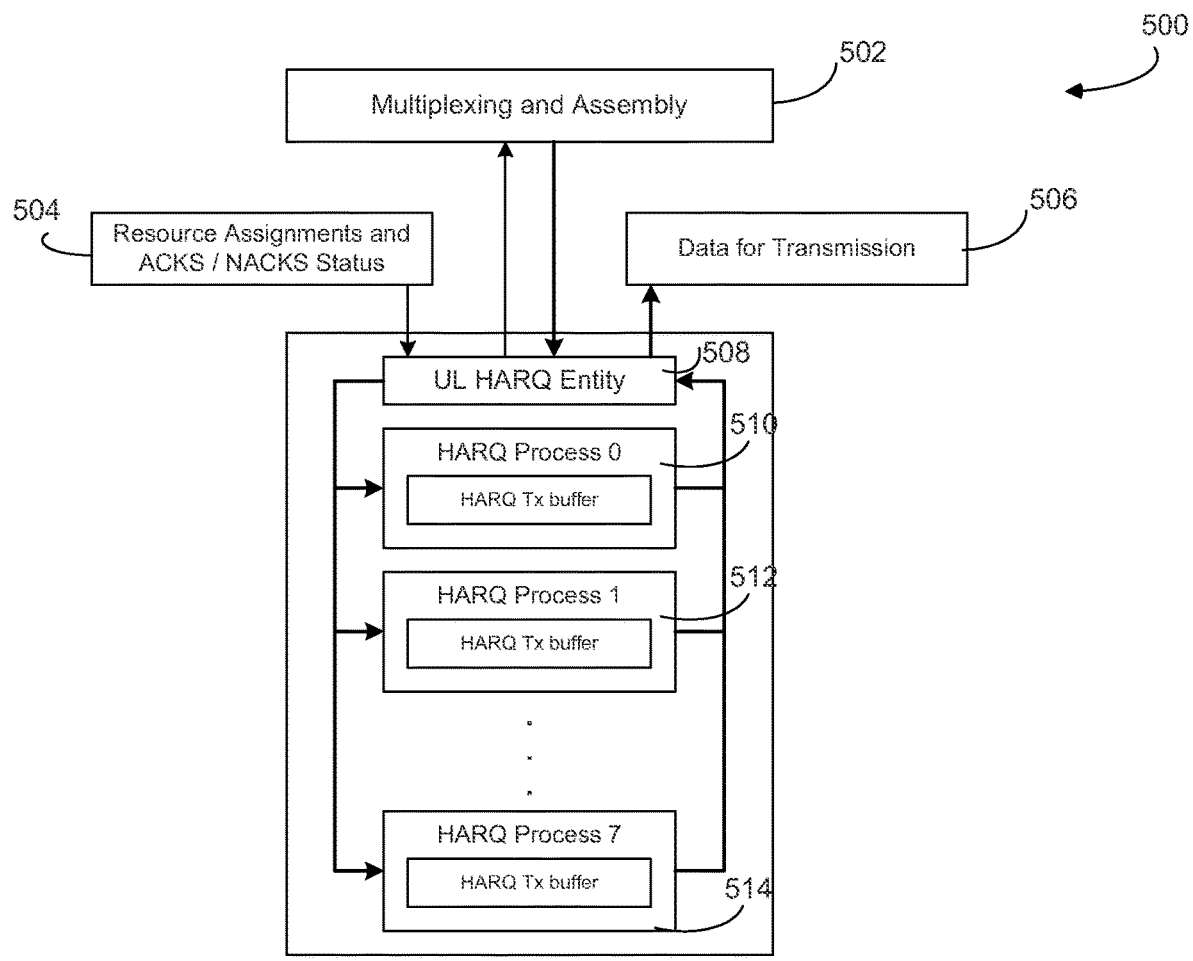
FIG. 5A is a schematic block diagram illustrating an uplink hybrid automatic repeat request (HARQ) entity at a user equipment device.

FIG. 5A is a schematic block diagram illustrating an uplink (UL) hybrid automatic repeat request (HARQ) entity at a user equipment device 500. As shown in FIG. 5A, an uplink HARQ entity 508 maintains a number of parallel uplink HARQ processes 510-514 allowing uplink transmissions to take place continuously while waiting for the HARQ feedback on the successful or unsuccessful reception of previous transmissions. A resource assignments and ACK/NACK status entity 504 may inform the uplink HARQ entity 508 about uplink transmission resource assignments and the received ACK/NACK status from the physical layer 202 (shown in FIG. 2). The uplink HARQ entity 508 may interact with a multiplexing and assembly entity 502 at the UE to obtain a MAC protocol data unit (PDU) for transmission from the multiplexing and assembly entity 502. The uplink HARQ entity 508 may instruct a data for transmission entity 506 to generate a new transmission, an adaptive retransmission, or a non-adaptive retransmission after receiving resource assignments, or ACK/NACK notification from the resource assignments and ACK/NACK status entity 504. The uplink HARQ entity 508, multiplexing and assembly entity 502, and the HARQ processes 510-514 may be located at a MAC layer 204 of the user equipment device (shown in FIG. 2). The resource assignments and ACK/NACK status entity 504 and data for transmission entity 506 may be located at a physical layer 202 of the user equipment device (shown in FIG. 2). Although 8 uplink HARQ processes (510, 512, 514) are shown in FIG. 5A, this is illustrative only and more or fewer than 8 uplink HARQ processes may be present.

Figure 5B:
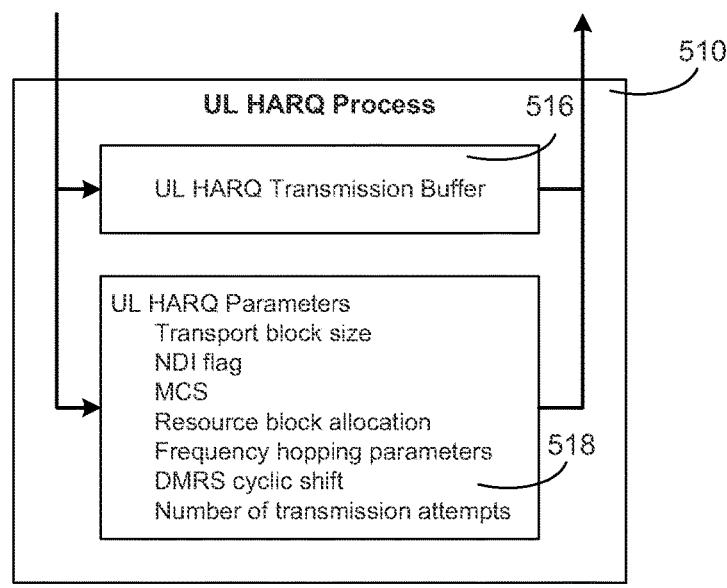
FIG. 5B is a schematic block diagram illustrating an uplink HARQ process at a user equipment device.

FIG. 5B is a schematic block diagram illustrating the uplink HARQ process module 510. The uplink HARQ process module 510 may be located at a MAC layer 204 of the user equipment device. The illustrated uplink HARQ process module 510 includes an uplink transmission buffer 516 and various uplink HARQ parameters 518. The uplink HARQ transmission buffer 516 stores the information bits which are transmitted. It may also be referred to as an HARQ buffer. The uplink HARQ parameters 518 may include various transmission parameters such as transport block size, new data indicator (NDI) flag, modulation and coding scheme (MCS), resource block allocation, frequency hopping parameters, demodulation reference signal (DMRS) cyclic shift, and number of transmission attempts, etc.

Figure 6:
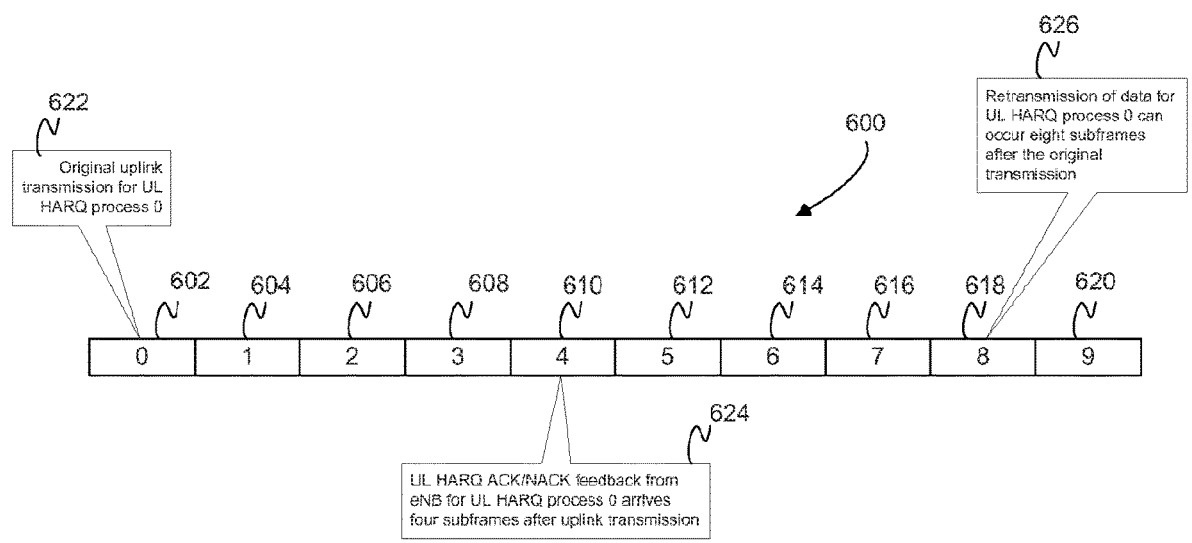
FIG. 6 is a schematic timing diagram illustrating a synchronous uplink HARQ operation at a user equipment device.

FIG. 6 is a schematic timing diagram 600 illustrating a synchronous uplink HARQ operation at a user equipment device. In an E-UTRA network, uplink HARQ transmission is synchronous in nature. That is, the uplink HARQ process index associated with a particular transmission time interval (TTI) is a function of the TTI value and is not explicitly signaled from the eNB to the UE in any (re)transmission instructions. In normal uplink HARQ operations, each of eight uplink HARQ processes has a transmission opportunity occurring every 8 ms (or every 8 subframes, with each subframe being 1 ms in length) for a frequency division duplexing (FDD) system. The uplink HARQ entity can use the current frame and subframe indices to determine which uplink HARQ process is associated with the current TTI. As shown in FIG. 6, each sub-block 602-620 represents a subframe and the subframe index is indicated in the center of each sub-block. As an example, a new uplink transmission 622 for uplink process 0 may occur at subframe 0 (shown as sub-block 602). The uplink HARQ ACK/NACK feedback 624 from the eNB for uplink HARQ process 0 arrives at 4 subframes after the initial new uplink transmission 622. If the new uplink transmission 622 is not received correctly at the eNB, i.e., a NACK is received at subframe 4 (shown as sub-block 610), a retransmission 626 for uplink HARQ process 0 can occur at subframe 8 (shown as sub-block 618), which is 8 subframes after the initial transmission 622 at subframe 0. If an ACK is received at subframe 4, the UE would consider that the new uplink transmission 622 is received successfully at the eNB and will not conduct subsequent non-adaptive retransmissions.

The timing relationships shown in FIG. 6 are illustrative of an EUTRA frequency division duplexing (FDD) system. The exact timing relationships for uplink HARQ operation in an EUTRA time division duplexing (TDD) system may be different, but are still synchronous in that uplink HARQ process indices are not explicitly signaled but can be derived from the relative timing of the relevant control signaling.

At each transmission opportunity, the uplink HARQ process associated with that transmission opportunity may be instructed by the uplink HARQ entity to perform one of the following actions: a new data transmission, an adaptive retransmission, a non-adaptive retransmission, or nothing. A new data transmission may be ordered by reception of an uplink grant on the physical downlink control channel (PDCCH), by reception of an uplink grant in a Random Access Response (RAR), or by an uplink grant being generated from a configured UL Semi-Persistent Scheduling (UL SPS) grant. An adaptive retransmission may be ordered via reception of an appropriately configured downlink control information (DCI) 0 on the PDCCH for the uplink HARQ process. An adaptive retransmission may be performed with different physical resources and/or parameters (signaled via the DCI 0) from the most recent transmission for the same transport block. A non-adaptive retransmission may be ordered via reception of a NACK on the physical HARQ indicator channel (PHICH) for the preceding transmission opportunity for the same uplink HARQ process. A non-adaptive retransmission is performed with the same frequency resources and MCS as the most recent transmission for the same transport block, but with a different HARQ redundancy version. The HARQ redundancy version may be 0, 1, 2, or 3. Nothing occurs if the transmission buffer of the uplink HARQ process is empty or if the current HARQ feedback for that uplink HARQ process is considered to be an ACK.

In this disclosure, new data transmissions, adaptive retransmissions, and non-adaptive retransmissions may all be referred to as uplink transmissions, and each one results in an uplink transmission of an UL-SCH MAC PDU in the form of a PUSCH transport block. The UL-SCH is an uplink transport channel which is mapped directly to the PUSCH physical channel.

When a downlink (DL) transport block is received on a physical downlink shared channel (PDSCH) for a UE, the UE will signal a corresponding ACK (i.e., the PDSCH transport block was successfully decoded) or NACK (i.e., the PDSCH transport block was not successfully decoded) on the uplink. This is normally accomplished in one of two ways. If a PUSCH transmission is being made in the same subframe, then the encoded downlink ACK/NACK information is punctured into that PUSCH transmission. If there is no PUSCH transmission being made in the same subframe, then the downlink ACK/NACK information is signaled via the physical uplink control channel (PUCCH). If a UE has a poor transmission channel or otherwise challenging channel conditions between itself and its serving eNB, then the eNB may configure that UE with ACK/NACK repetition. When the UE is configured with ACK/NACK repetition, an ACK/NACK transmitted on the uplink in response to a downlink reception on the PDSCH is repeated multiple times, for example, 2, 4, or 6 times (depending upon the configured repetition factor) in consecutive uplink subframes. The ACK/NACK signal which is part of an ACK/NACK repetition sequence is transmitted on an appropriate PUCCH resource. Collisions may occur when an uplink transmission is scheduled at the same subframe as part of the ACK/NACK repetition sequence is scheduled to transmit. Because the UE is not allowed to multiplex the ACK/NACK repetition sequence with the uplink transmission into a PUSCH transmission, the scheduled uplink transmission is refrained and the ACK/NACK signal will be transmitted on PUCCH when collisions occur. The eNB may identify that the scheduled uplink transmission for the UE collides with the ACK/NACK signal from the UE and thus refrain from decoding the scheduled uplink transmission. Since the scheduled PUSCH transmission is never actually made, the UE's physical layer does not attempt to receive uplink HARQ ACK/NACK on PHICH. The HARQ_FEEDBACK state variable of the corresponding uplink HARQ process consequently remains set at NACK. Unless a DCI 0 for the next transmission opportunity for the uplink HARQ process is received, this NACK value of HARQ_FEEDBACK will automatically trigger a non-adaptive retransmission which may not be expected by the eNB. In certain situations, the eNB may have allocated those uplink resources elsewhere and the unexpected non-adaptive retransmission by the first UE may cause uplink interference to uplink transmissions by other UEs. This may degrade the uplink system throughput which is undesirable. Embodiments to avoid the unexpected uplink non-adaptive retransmission are described in this disclosure such that potential uplink interference caused by the unexpected non-adaptive retransmissions is reduced.

Figure 7:
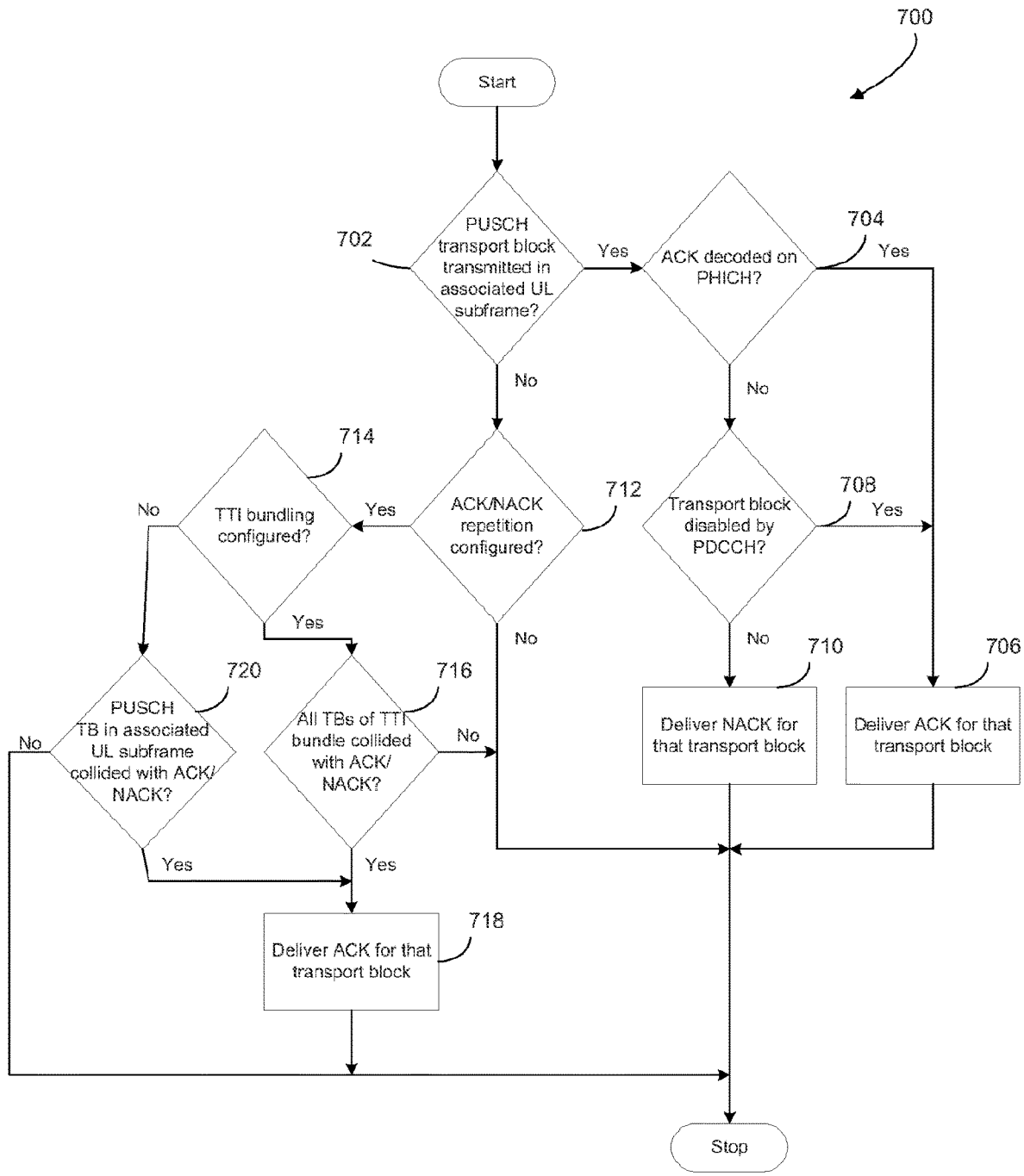
FIG. 7 is a process flow chart illustrating a method for handling an uplink transmission collision with an ACK/NACK signal by a physical layer at a user equipment device.

FIG. 7 is a process flowchart 700 illustrating a method for handling an uplink transmission collision with an ACK/NACK signal by a physical layer at a user equipment device. As shown in FIG. 7, for a downlink subframe i, a UE checks whether a PUSCH transport block was transmitted in associated uplink subframe at step 702. In an EUTRA FDD system, the associated uplink subframe occurs 4 subframes earlier than the downlink subframe i. For example, if the downlink subframe index i is 6, the associated uplink subframe would be subframe 2 within the same radio frame. For an EUTRA TDD system, the relative timing offset between a downlink subframe and the associated uplink subframe may be different than for an EUTRA FDD system, but this relative timing offset is known by the user equipment device. If a PUSCH transport block was transmitted in the associated uplink subframe, the UE further checks whether an ACK is decoded on PHICH at step 704. If an ACK is decoded, the physical layer delivers the ACK for the PUSCH transport block to higher layers at step 706. Specifically, the higher layers may include a MAC layer 204 at the UE (shown in FIG. 2). If there is no ACK decoded on PHICH, the UE checks whether the PUSCH transport block was disabled by PDCCH at step 708. If the transport block was disabled by PDCCH, the physical layer delivers an ACK for that transport block at step 706. Otherwise, if the transport block is not disabled by PDCCH, the physical layer delivers a NACK for that transport block to higher layers at step 710.

Steps 704-710 occur when a PUSCH transport block was transmitted in the associated uplink subframe. If there was an uplink transmission collision with an ACK/NACK signal for the associated uplink subframe, no PUSCH transport block would be transmitted in the associated uplink subframe and the UE would not follow steps 704-710. Instead, the UE checks whether an ACK/NACK repetition is configured at step 712. If the ACK/NACK repetition is not configured, the physical layer would not deliver any ACK or NACK to high layers and the uplink HARQ feedback processing for this particular downlink subframe i is completed. If the ACK/NACK repetition is configured at the UE, the UE continues to check whether a TTI bundling is configured at step 714. In normal operation when TTI bundling is not configured, a transmission opportunity is a single 1 ms subframe and is associated with a single transport block. When TTI bundling is configured, a transmission opportunity is a set of multiple consecutive uplink subframes, e.g., 4 consecutive uplink subframes. If TTI bundling is configured, the UE checks whether all transport blocks of the TTI bundle collided with the ACK/NACK repetition sequence at step 716. If there is no collision or only partial collision between the transport blocks of the TTI bundle and the ACK/NACK signals, the physical layer would not deliver any ACK or NACK to higher layers and the uplink HARQ feedback processing for this particular downlink subframe i is completed. However, if all transport blocks of the TTI bundle collided with ACK/NACK signals, the physical layer would deliver an ACK for that transport block to higher layers at step 718. By delivering an ACK to the higher layers at step 718, the higher layers would consider that the eNB does not wish a non-adaptive retransmission of the PUSCH transport block at the current time and thereby subsequent non-adaptive retransmission for the PUSCH transport block is refrained. On the other hand, because the UE would not perform any subsequent non-adaptive retransmission for the PUSCH transport block, the eNB may refrain from decoding the scheduled uplink transmission. The eNB can allocate the uplink resources for other UEs. The eNB may order an adaptive retransmission for the PUSCH transport block such that the UE would transmit the PUSCH transport block using resources allocated for the adaptive retransmission.

If the TTI bundling is not configured, the UE would check whether the scheduled PUSCH transport block in the associated uplink subframe collided with an ACK/NACK signal at step 720. The ACK/NACK signal may be part of an ACK/NACK repetition sequence. If there was a collision between the PUSCH transport block and the ACK/NACK signal, the physical layer would deliver an ACK for that transport block to higher layers at step 718. By delivering an ACK to the higher layers at step 718, the higher layers would consider that the eNB does not wish a non-adaptive retransmission of the PUSCH transport block at the current time and thereby subsequent non-adaptive retransmission for the PUSCH transport block is refrained. If there was no collision, the physical layer would not deliver any ACK or NACK to higher layers and the uplink HARQ feedback processing for this particular downlink subframe i is completed.

Figure 8:
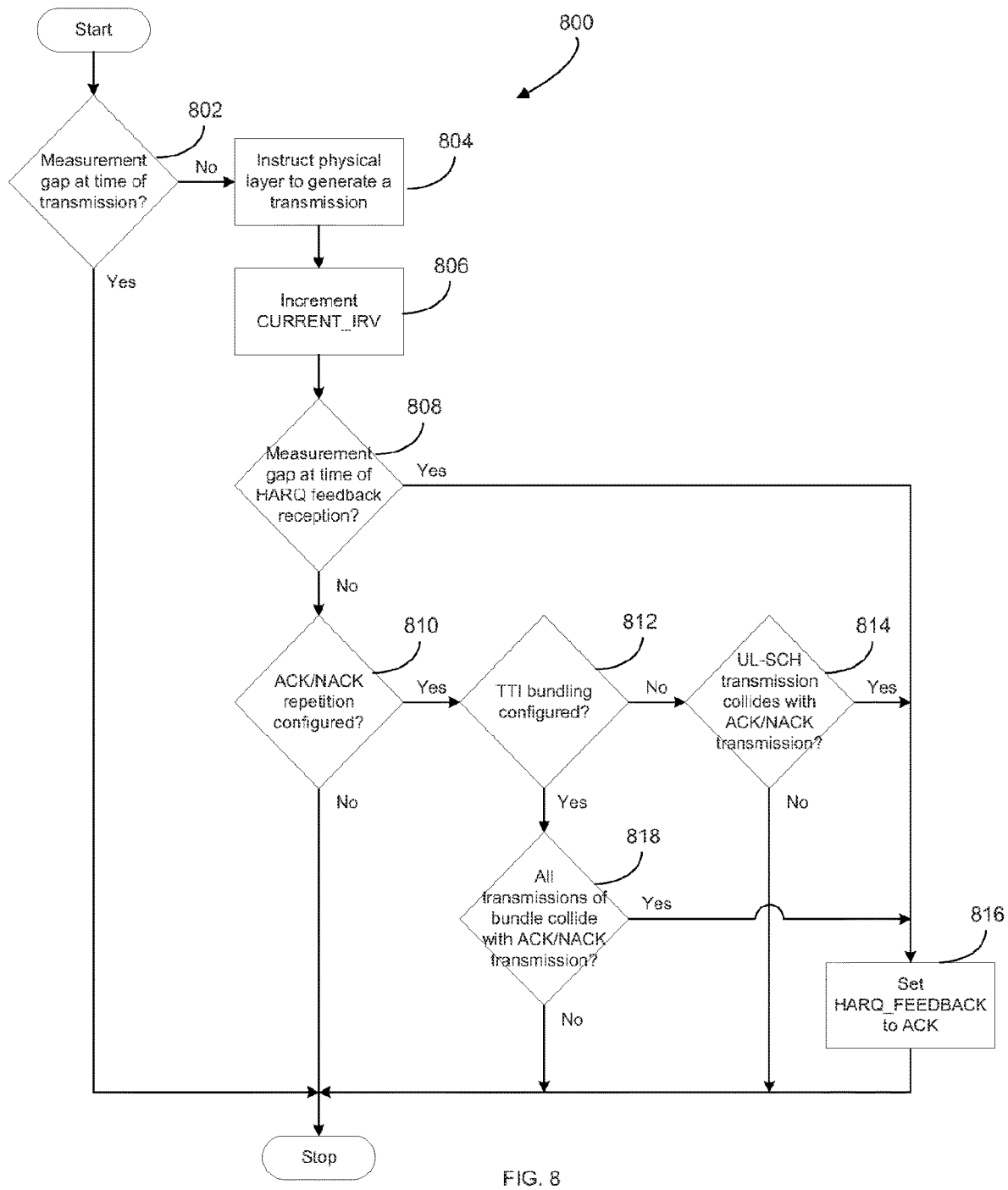
FIG. 8 is a process flow chart illustrating a method for handling an uplink transmission collision with an ACK/NACK signal by a MAC layer at a user equipment device.

FIG. 8 is a process flowchart 800 illustrating a method for handling an uplink transmission collision with an ACK/NACK signal by a MAC layer at a user equipment device. As shown in FIG. 8, for an uplink subframe j, the MAC layer HARQ process first checks whether a measurement gap occurs at a time of a scheduled transmission at step 802. A UE may need to make measurements of other cells which either are E-UTRA but which operate on a different frequency band or which belong to a different radio access technology (RAT) completely. Most UEs only have one radio for receiving, and hence must tune away this radio from the operating frequency band of its serving cell in order to make inter-frequency and/or inter-RAT measurements. In order to facilitate this, an eNB may configure a UE with measurement gaps, during which the UE is allowed to tune away from the operating frequency band of its serving cell. Consequently, a UE cannot receive from nor transmit to the serving cell during a configured measurement gap. If a measurement gap occurs at the time of a scheduled transmission, the transmission does not take place. Otherwise, the MAC layer HARQ process instructs the physical layer to generate a transmission at step 804 and increments the current redundancy version index by 1 at step 806. The transmission at step 804 may be an uplink transmission for new data, an uplink non-adaptive retransmission, or an uplink adaptive retransmission on the UL-SCH or PUSCH.

After incrementing the redundancy version index at step 806, the MAC layer HARQ process checks whether a measurement gap occurs at the time of HARQ feedback reception corresponding to the uplink transmission at step 808. If a measurement gap occurs at the time of HARQ feedback reception, the UE would not be able to receive the HARQ feedback. As a result, the MAC layer HARQ process would consider that the eNB does not wish a non-adaptive retransmission of the PUSCH transport block at the current time and set HARQ feedback to ACK at step 816. If no measurement gap occurs at the time of HARQ feedback reception, the MAC layer HARQ process checks whether an ACK/NACK repetition is configured at the UE at step 810. If no ACK/NACK repetition is configured, the HARQ feedback received from the physical layer would not be changed. If an ACK/NACK repetition is configured, the MAC layer further checks whether a TTI bundling is configured at step 812. If TTI bundling is configured, the MAC layer checks whether all transmissions of the TTI bundle collide with the transmission of an ACK/NACK signal belonging to an ACK/NACK repetition sequence at step 818. If no collision or only partial collision between the transmissions of the TTI bundle and the ACK/NACK signals is identified, the MAC layer HARQ process would not set the HARQ feedback value. If all transmissions of the TTI bundle collide with ACK/NACK transmissions, the transmission of the TTI bundle would be refrained and the MAC layer HARQ process would set HARQ feedback to ACK at step 816. The ACK/NACK transmissions colliding with the transmissions of the TTI bundle may belong to the same ACK/NACK repetition sequence or multiple different ACK/NACK repetition sequences. Consequently, subsequent non-adaptive retransmissions for the uplink transmission at step 804 are refrained at the UE.

If the TTI bundling is not configured, the UE would check whether the UL-SCH transmission at step 804 collides with an ACK/NACK transmission at step 814. The ACK/NACK transmission may be an ACK/NACK signal that is part of an ACK/NACK repetition sequence. If the UL-SCH transmission collides with an ACK/NACK transmission, the scheduled UL-SCH transmission would be refrained and the MAC layer HARQ process would set the HARQ feedback to ACK at step 816. Non-adaptive retransmissions for the scheduled UL-SCH transmission would be refrained as a result. If no collision is identified between the scheduled UL-SCH and the ACK/NACK transmission, the MAC layer HARQ process would not set the HARQ feedback value for the scheduled UL-SCH transmission at this instance. The eNB may identify that a scheduled UL-SCH transmission for the UE collides with the ACK/NACK transmission and correspondingly choose to refrain from decoding the scheduled UL-SCH transmission. Furthermore, the eNB may identify that a scheduled UL-SCH transmission for the UE collides with the ACK/NACK transmission and correspondingly choose to refrain from decoding a subsequent non-adaptive retransmission for the scheduled UL-SCH if there is a collision between the scheduled UL-SCH transmission and the ACK/NACK transmission. The eNB may order a subsequent adaptive retransmission for the scheduled UL-SCH to request the UE to transmit the scheduled UL-SCH.

Figure 9:
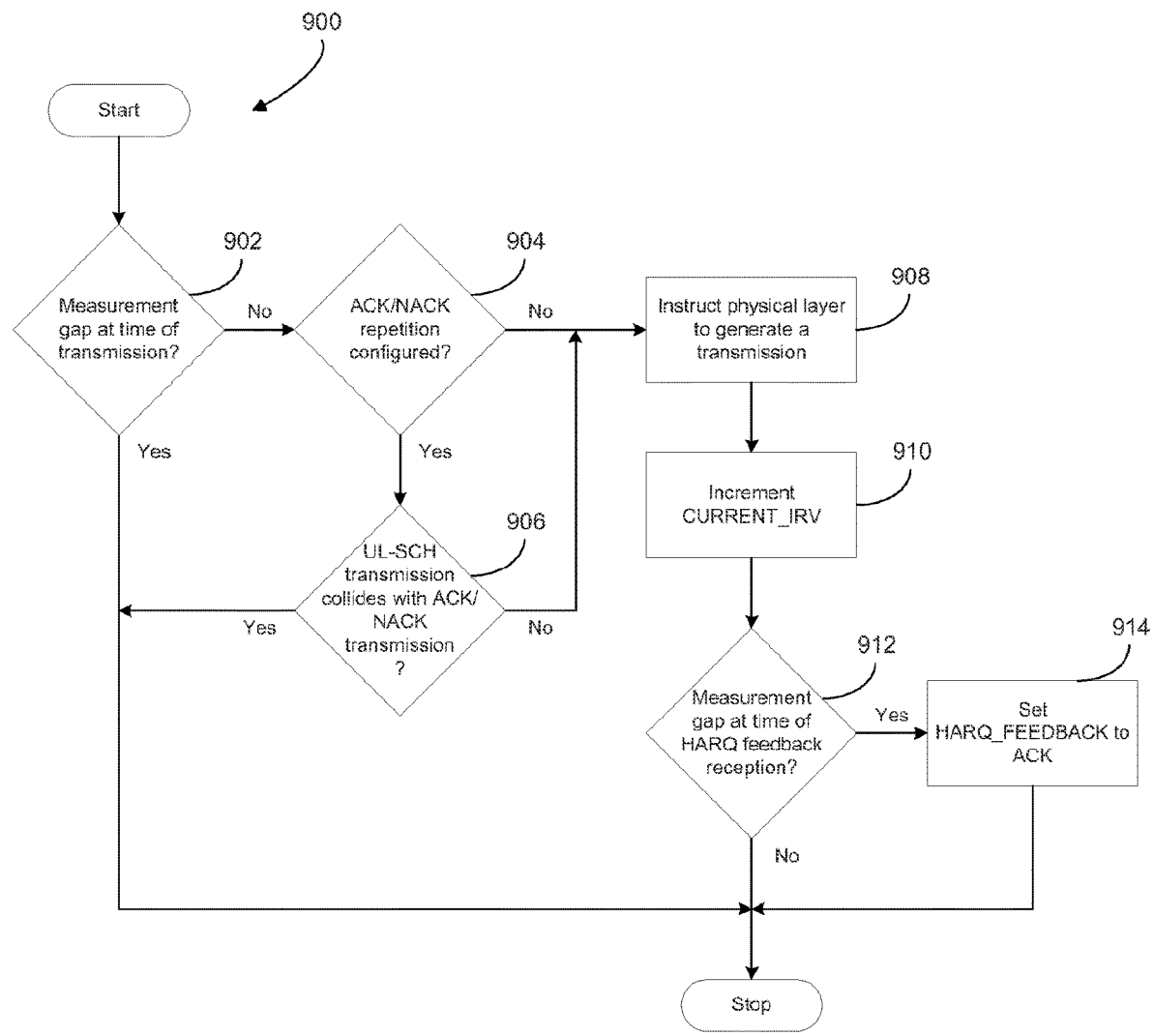
FIG. 9 is a process flow chart illustrating an alternative method for handling an uplink transmission collision with an ACK/NACK signal by a MAC layer at a user equipment device.

FIG. 9 is a process flowchart 900 illustrating an alternative method for handling an uplink transmission collision with an ACK/NACK signal by a MAC layer at a user equipment device. In the illustrated embodiment 900, successive non-adaptive retransmissions are triggered but with a non-incremented redundancy version index to ensure that a particular redundancy version in the redundancy version cycle is not missed. If the transmission corresponding to a particular redundancy version is not made, this may affect the decoding performance at the eNB. For example, if redundancy version 0 is not transmitted, which may contain the systematic bits from the transport block, it becomes more difficult to decode the transport block at the eNB receiver. The illustrated embodiment 900 allows a complete cycle through a set of four redundancy versions associated with the scheduled UL-SCH uplink transmission such that improved eNB decoding performance may be achieved.

As shown in FIG. 9, the MAC layer HARQ process first checks whether a measurement gap occurs at the time of a scheduled uplink transmission at step 902. The scheduled uplink transmission may be an UL-SCH uplink transmission that would be mapped to a physical layer PUSCH transmission. If there is a measurement gap at the time of the scheduled uplink transmission, the scheduled uplink transmission would be refrained from transmitting and no further changes to the HARQ process would be made. If no measurement gap occurs at the time of the scheduled uplink transmission, the HARQ process continues to check whether an ACK/NACK repetition is configured at the UE at step 904. If an ACK/NACK repetition is configured at the UE, the HARQ process checks whether the scheduled UL-SCH transmission collides with an ACK/NACK transmission at step 906. The ACK/NACK transmission may be an ACK/NACK signal that is part of an ACK/NACK repetition sequence. If a collision between the scheduled UL-SCH transmission and the ACK/NACK transmission is determined at the UE, the UE would refrain from transmitting the scheduled UL-SCH transmission. The eNB may identify that a scheduled UL-SCH transmission for the UE collides with the ACK/NACK transmission and correspondingly choose to refrain from decoding the scheduled UL-SCH transmission. Furthermore, the MAC layer HARQ process of the UE would refrain from incrementing the HARQ redundancy version index for a subsequent non-adaptive retransmission for the scheduled UL-SCH transmission. In other words, a subsequent non-adaptive retransmission for the scheduled UL-SCH transmission would be transmitted, but with the same HARQ redundancy version index as the HARQ redundancy version index for the scheduled UL-SCH transmission. The HARQ redundancy version index may be one of 0, 1, 2 and 3, and indexes into an HARQ redundancy version cycle of {0, 2, 3, 1}. Any increments of the HARQ redundancy version index are performed modulo 4. The subsequent non-adaptive retransmission for the scheduled UL-SCH transmission may occur at 8 subframes (for an EUTRA FDD system) after refraining from transmitting the scheduled UL-SCH by the UE. At the network side, the eNB may identify that a scheduled UL-SCH transmission for the UE collides with the ACK/NACK transmission and correspondingly refrain from incrementing the HARQ redundancy version index for decoding the subsequent non-adaptive retransmission for the scheduled UL-SCH transmission from the UE.

In the circumstances where no UL-SCH transmission collision with ACK/NACK transmission is identified or the ACK/NACK repetition is not configured, the MAC layer HARQ process at the UE would instruct the physical layer at the UE to generate a PUSCH transmission for the scheduled UL-SCH transmission at step 908. After step 908, the MAC layer HARQ process would increment the current HARQ redundancy version index by 1 at step 910 to prepare for a next non-adaptive retransmission. Then the MAC layer HARQ process checks whether a measurement gap occurs at the time of HARQ feedback reception for the scheduled UL-SCH transmission at step 912. If a measurement gap occurs at the time of HARQ feedback reception, the MAC layer HARQ process would set the HARQ feedback to ACK at step 914, such that non-adaptive retransmissions for the scheduled UL-SCH uplink would not occur. Otherwise, the HARQ feedback value would not be set by the MAC layer HARQ process at this instance.

Figure 10:
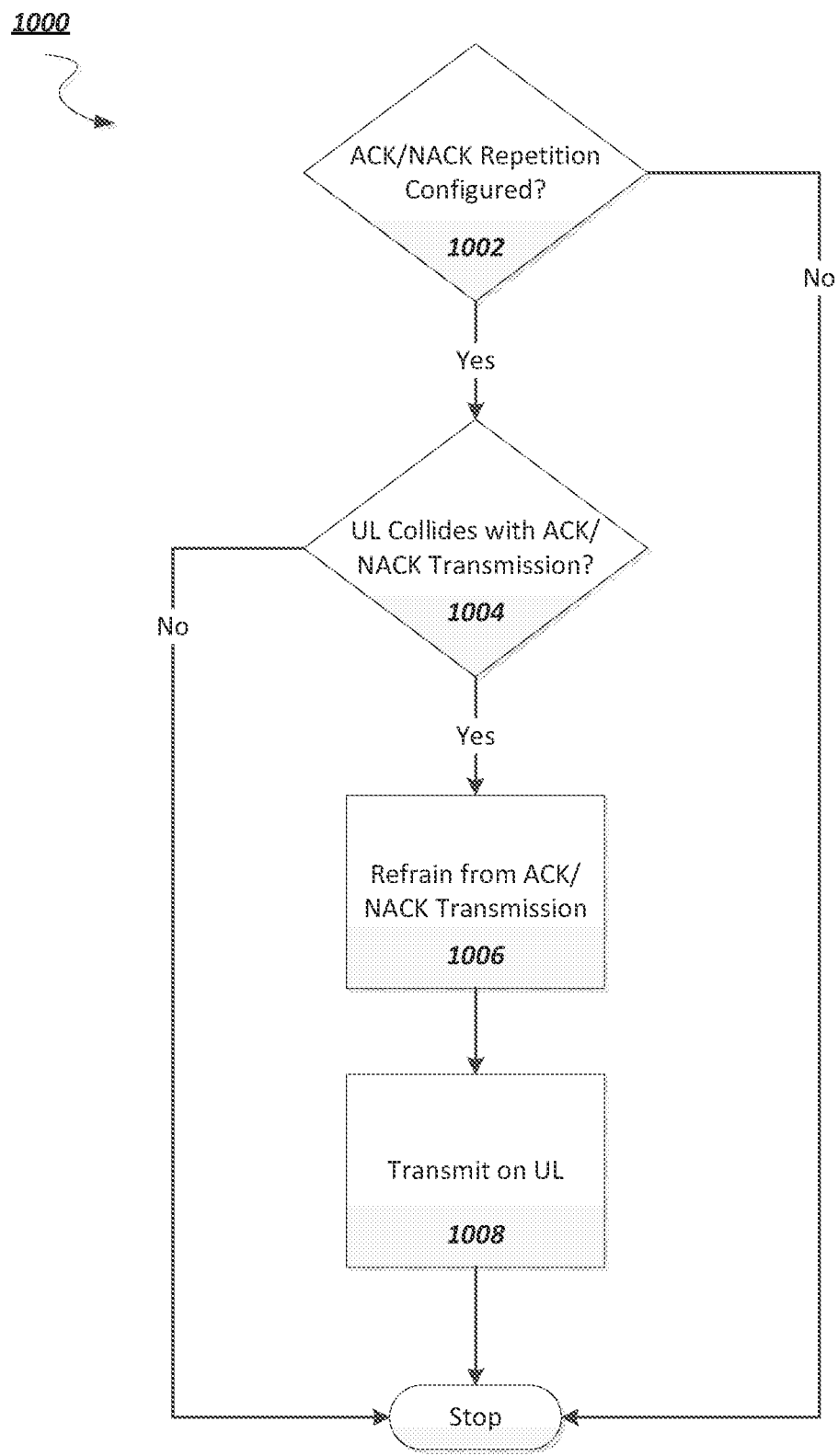
FIG. 10 is a process flow chart illustrating an alternative method for handling an uplink transmission collisions with an ACK/NACK signal.

FIG. 10 is a process flow chart 1000 illustrating an alternative method for handling an uplink transmission collisions with an ACK/NACK signal. In certain instances of implementations (such as those described in FIGS. 7-9), it may be desirable to perform an uplink transmission in view of a UL subframe collision with the ACK/NACK, and refrain from communicating the ACK/NACK signal. It may be determined that a pending uplink transmission collides with a transmission of an acknowledgement/negative acknowledgement (ACK/NACK) signal (1004). In certain instances, the ACK/NACK signal may be part of an ACK/NACK repetition sequence (1002). Responsive to determining that there is a collision, the ACK/NACK signal may be refrained from being transmitting. The uplink transmission may be transmitted on the subframe.

While several embodiments have been provided in the present disclosure, it should be understood that the disclosed systems and methods may be embodied in many other specific forms without departing from the scope of the present disclosure. The present examples are to be considered as illustrative and not restrictive, and the intention is not to be limited to the details given herein. For example, the various elements or components may be combined or integrated in another system or certain features may be omitted, or not implemented.

Also, techniques, systems, subsystems and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

While the above detailed description has shown, described, and pointed out the fundamental novel features of the disclosure as applied to various embodiments, it will be understood that various omissions and substitutions and changes in the form and details of the system illustrated may be made by those skilled in the art, without departing from the intent of the disclosure.

What is claimed is:

1. A method in a user equipment (UE) comprising:
receiving, at the UE, first configuration information indicating the UE to perform an acknowledgement/negative acknowledgement (ACK/NACK) repetition;
in response to the first configuration information indicating the ACK/NACK repetition:
determining, by the UE, that a transmission time interval (TTI) bundling is not configured;
responsive to determining that the TTI bundling is not configured, determining, by the UE, that a first scheduled physical uplink shared channel (PUSCH) transmission from the UE collides with a transmission of a first ACK/NACK signal from the UE, the first ACK/NACK signal being part of an ACK/NACK repetition sequence; and
responsive to the determining that the first scheduled PUSCH transmission collides with the transmission of the first ACK/NACK signal:
omitting, by the UE, the transmission of the first ACK/NACK signal;
transmitting the first scheduled PUSCH transmission;
setting a hybrid automatic repeat request (HARQ) feedback for the first scheduled PUSCH transmission to an ACK by an HARQ process in response to delivering an ACK from a physical layer to a higher layer of the UE; and
in response to setting the HARQ feedback to an ACK, refraining from non-adaptive retransmissions for the first scheduled PUSCH transmission.

2. The method of claim 1, further comprising identifying, by a medium access control (MAC) layer of the UE, a collision between the first scheduled PUSCH transmission and the first ACK/NACK signal.

3. The method of claim 1, wherein the ACK/NACK signal is transmitted on an uplink in response to a physical downlink shared channel (PDSCH) reception.

4. The method of claim 1, wherein the ACK/NACK repetition sequence comprises the first ACK/NACK signal repeated 2, 4, or 6 times in consecutive uplink subframes.

5. A user equipment (UE) for operating in a wireless communications network, comprising one or more processors configured to:
receive, at the UE, first configuration information indicating the UE to perform an acknowledgement/negative acknowledgement (ACK/NACK) repetition;
in response to the first configuration information indicating the ACK/NACK repetition:
determining, by the UE, that a transmission time interval (TTI) bundling is not configured;
responsive to determining that the TTI bundling is not configured, determine, by the UE, that a first scheduled physical uplink shared channel (PUSCH) transmission from the UE collides with a transmission of a first ACK/NACK signal from the UE, the first ACK/NACK signal being part of an ACK/NACK repetition sequence; and
responsive to the determining that the first scheduled PUSCH transmission collides with the transmission of the first ACK/NACK signal:
omit, by the UE, the transmission of the first ACK/NACK signal;
transmit the first scheduled PUSCH transmission;
set a hybrid automatic repeat request (HARQ) feedback for the first scheduled PUSCH transmission to an ACK by an HARQ process; and
in response to setting the HARQ feedback to an ACK, refrain from non-adaptive retransmissions for the first scheduled PUSCH transmission.

6. The UE of claim 5, the one or more processors further configured to identify, by a medium access control (MAC) layer of the UE, a collision between the first scheduled PUSCH transmission and the first ACK/NACK signal.

7. The UE of claim 5, wherein the ACK/NACK signal is transmitted on an uplink in response to a physical downlink shared channel (PDSCH) reception.

8. The UE of claim 5, wherein the ACK/NACK repetition sequence comprises the first ACK/NACK signal repeated 2, 4, or 6 times in consecutive uplink subframes.

* * * * *